United States Patent
Kato et al.

(10) Patent No.: US 8,072,521 B2
(45) Date of Patent: Dec. 6, 2011

(54) SOLID-STATE IMAGING DEVICE, METHOD FOR DRIVING SOLID-STATE IMAGING DEVICE AND IMAGING APPARATUS

(75) Inventors: Akihiko Kato, Tokyo (JP); Tadayuki Taura, Kanagawa (JP); Yoshinori Muramatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 775 days.

(21) Appl. No.: 11/668,643

(22) Filed: Jan. 30, 2007

(65) Prior Publication Data

US 2008/0055442 A1    Mar. 6, 2008

(30) Foreign Application Priority Data

Jan. 30, 2006  (JP) ................ P2006-019990

(51) Int. Cl.
*H04N 3/14* (2006.01)

(52) U.S. Cl. .................................... 348/298

(58) Field of Classification Search .......... 348/298, 348/303, 304, 323
See application file for complete search history.

(56) References Cited

U.S. PATENT DOCUMENTS

| | | | | |
|---|---|---|---|---|
| 3,696,250 A * | 10/1972 | Weimer | ................ | 250/553 |
| 4,910,599 A * | 3/1990 | Hashimoto | ................ | 348/240.2 |
| 6,466,265 B1 * | 10/2002 | Lee et al. | ................ | 348/308 |
| 6,900,837 B2 * | 5/2005 | Muramatsu et al. | ................ | 348/243 |
| 7,141,775 B2 * | 11/2006 | Koseki | ................ | 250/208.1 |
| 2005/0276147 A1 * | 12/2005 | Shimbayashi | ................ | 365/230.05 |

FOREIGN PATENT DOCUMENTS

JP    2000-032344    1/2000

* cited by examiner

*Primary Examiner* — Luong T Nguyen
(74) *Attorney, Agent, or Firm* — SNR Denton US LLP (57) ABSTRACT

A solid state imaging device with pixels in a two-dimensional array, a controller which performs window cutting on signals read out of the pixel array in multiple column units on a column-address basis, and a selector which, when the cutting window overlaps with a multiple column unit, holds signals in a present multiple column unit and in a previous column unit, and then outputs selected consecutive signals.

8 Claims, 5 Drawing Sheets

SOLID-STATE IMAGING DEVICE, METHOD FOR DRIVING SOLID-STATE IMAGING DEVICE AND IMAGING APPARATUS

CROSS REFERENCES TO RELATED APPLICATIONS

The present invention contains subject matter related to Japanese Patent Application JP 2006-019990 filed in the Japanese Patent Office on Jan. 30, 2006, the entire contents of which being incorporated herein by reference.

BACKGROUND OF THE INVENTION

1. Field of the Invention

The invention relates to a solid-state imaging device, a method for driving the solid-state imaging device and an imaging apparatus.

2. Description of the Related Art

In an solid-state imaging device of related art, such as a CMOS image sensor, to increase the signal output rate and reduce power consumption, when pixel data read from pixels are horizontally transferred, a plurality of columns in the pixel matrix array are used as a unit and the signals of the pixels in the plurality of columns are horizontally transferred and outputted in parallel on a row basis (see JP-A-2000-32344, for example).

In a CMOS image sensor configured to perform parallel transfer and output, for example, when the number of the plurality of columns is four, the number of outputs in horizontal transfer is four, that is, four outputs 1, 2, 3 and 4. The signal of each column will be outputted according to the order of the columns to be transferred, 4n+1, 4n+2, 4n+3 and 4n+4 (n is an integer).

SUMMARY OF THE INVENTION

However, in the related art, when so-called window cutting, in which signals are read from the pixels in a specific area in the pixel matrix array, is performed, and the signal of the first pixel in the thus cut window is outputted as the output 1 in order to simplify signal processing in a downstream signal processing system, the cutting unit may be always limited to a multiple of 4, so that the pixel unit of the window to be cut becomes disadvantageously coarse.

Thus, it is desirable to provide a solid-state imaging device that is configured to perform parallel transfer and output and can achieve window cutting using a unit smaller than a multiple-column unit independent of the parallel output start position and the number of parallel outputs. It is also desirable to provide a method for driving the solid-state imaging device and an imaging apparatus.

According to an embodiment of the invention, there is provided a solid-state imaging device including: a pixel array unit formed of pixels two-dimensionally arranged in a matrix, each having a photoelectric converter, and outputs the signals read from the pixels in the pixel array unit in parallel on a multiple-column basis. When window cutting, in which signals are read from the pixels in a specific area in the pixel array unit, is performed on a column-address basis such that the window overlaps with the multiple-column unit, the signals read from the pixels in the present column-address unit and the signals read from the pixels in the preceding column-address unit are held, from which consecutive signals on the multiple-column basis are selected and outputted.

In the solid-state imaging device that outputs the signals of pixels in parallel on a multiple-column basis, since consecutive signals on the multiple-column basis can be selected from the signals of the present column-address unit and the preceding column-address unit, window cutting can be performed on a column-address basis such that the window overlaps with the multiple-column unit even when the cutting unit is not a multiple of the multiple-column unit.

According to an embodiment of the invention, since the window cutting can be performed without limiting the cutting unit to a multiple of a multiple-column unit, the window cutting can be performed using a unit smaller than the multiple-column unit independent of the parallel output start position and the number of parallel outputs.

DESCRIPTION OF THE PREFERRED EMBODIMENTS

An embodiment of the invention will be described below in detail with reference to the drawings.

Figure 1:
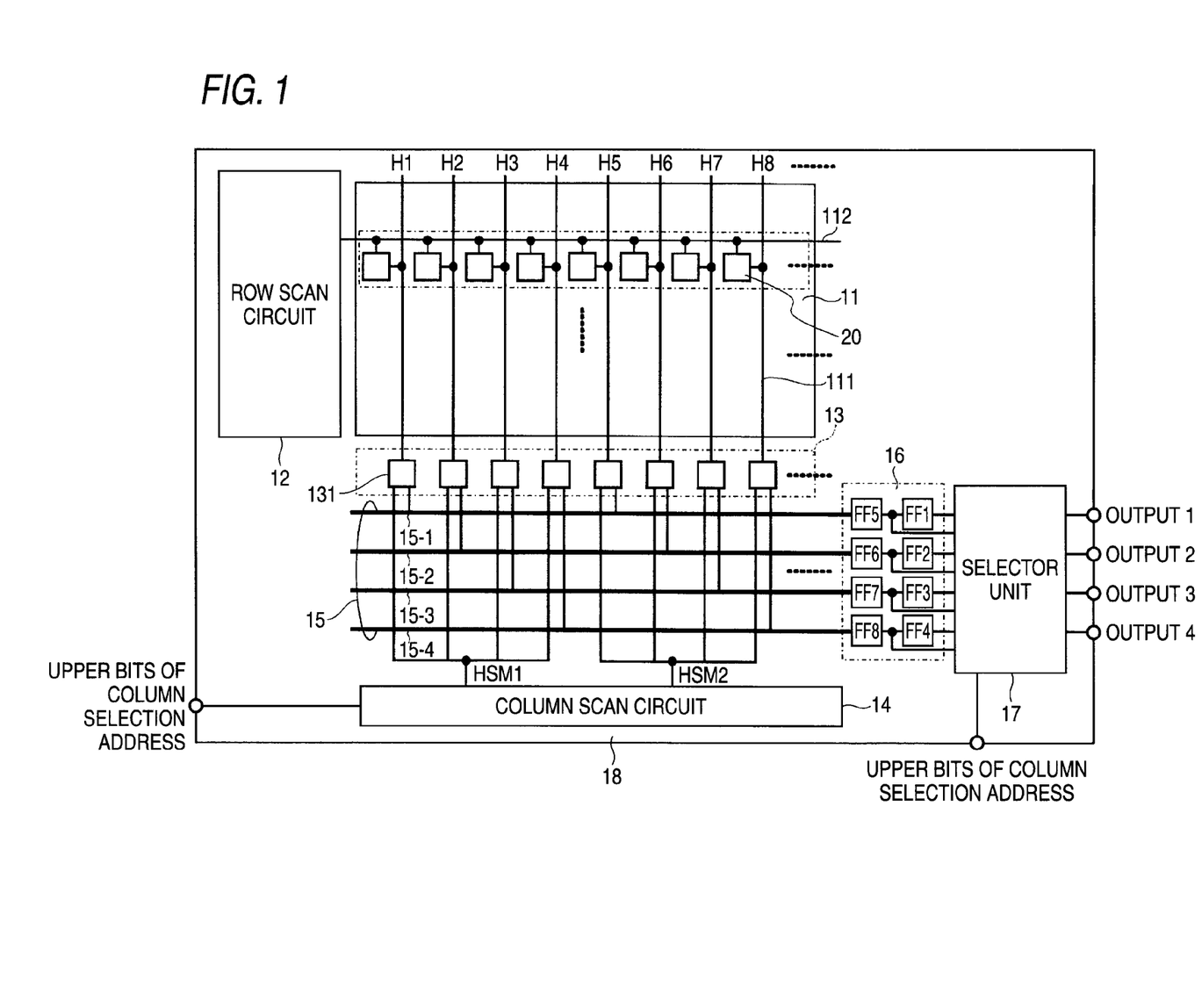
FIG. 1 is a schematic block diagram showing the solid-state imaging device according to one embodiment of the invention.

FIG. 1 is a schematic block diagram showing the solid-state imaging device according to one embodiment of the invention. In this embodiment, the solid-state imaging device will be described with reference to a CMOS image sensor.

As shown in FIG. 1, the solid-state imaging device according to this embodiment includes a pixel array unit 11, a row scan circuit 12, a column signal processing circuit 13, a column scan circuit 14, bus lines 15, a hold circuit 16 and a selector unit 17. These components are mounted on a single semiconductor substrate (chip) 18.

The pixel array unit 11 includes pixels 20 two-dimensionally arranged in a matrix, each having a photoelectric converter. A vertical signal line 111 is wired to each column in the matrix pixel arrangement, and one or more drive control lines are wired to each row. The configuration of the pixel 20 will not be described in detail because it is not associated with the feature of the invention. FIG. 1 only shows pixels in eight columns H1 to H8 in a certain row for clarity of the figure.

In the solid-state imaging device according to this embodiment, in order to increase the signal output rate and reduce power consumption, the pixel array unit 11 is configured such that when pixel data read from pixels 20 are horizontally transferred, a plurality of columns of the pixel matrix arrangement, for example, four columns, are used as a unit and the signals of the pixels in the four columns are horizontally transferred and outputted in parallel on a row basis (four parallel outputs).

The row scan circuit 12 includes a shift register, an address decoder or the like, and selects and scans each pixel 20 in the pixel array unit 11 on a row basis. The column signal processing circuit 13 includes a plurality of column circuits 131, for example, arranged for each pixel column in the pixel array unit 11, that is, arranged such that one column circuit 131 corresponds to one pixel column, performs a predetermined signal processing on the signal outputted via the vertical signal line 111 from each pixel 20 in the row selected when the row scan circuit 12 performs a scan, and temporarily holds the pixel signal that underwent the signal processing.

More specifically, the column circuits 131 receive analog signals outputted from the pixels 20 in one row selected by the row scan circuit 12 in such a way that each column circuit 131 receives the analog signal for each pixel column, simultaneously convert the analog signals from that one row into digital signals, and perform signal processing, such as CDS (Correlated Double Sampling) for removing pixel-specific fixed pattern noise and signal amplification.

The digital signals that underwent the signal processing are outputted out of the semiconductor substrate 18 by a horizontal transfer operation performed by the column scan circuit 14, the four bus lines 15-1 to 15-4 corresponding to the four parallel outputs, the hold circuit 16 and the selector unit 17. From the outside of the semiconductor substrate 18, the upper bits of a column selection address that specify column addresses are inputted to the column scan circuit 14 and the lower bits of the column selection address are inputted to the selector unit 17.

The upper bits of the column selection address select four columns as one unit corresponding to the four parallel outputs, while the lower bits of the column selection address select individual columns in the four columns selected by the upper bits.

The column scan circuit 14 includes, for example, an address decoder and uses the upper bits of the column selection address inputted from a controller (not shown) external to the semiconductor substrate 18 to select the column circuits 131 in the corresponding columns. In this example, since the digital data that underwent the signal processing in the column signal processing circuit 13 are transferred and outputted in the four-parallel fashion, the column scan circuit 14 selects and scans four column circuits 131 as a unit.

When the column scan circuit 14 selects and scans four column circuits 131, these four column circuits 131 output digital data onto the four bus lines 15-1 to 15-4 corresponding to the four parallel outputs. The upper bits of the column selection address are incremented for each unit clock for the transfer operation in which digital data are outputted. As a result, the column scan circuit 14 performs the selection and scan operation for each unit clock, and the selected four column circuits 131 output digital data onto the bus lines 15-1 to 15-4.

The hold circuit 16 has a two-stage configuration in which four front flip-flops FF1 to FF4 and four subsequent flip-flops FF5 to FF8 that are provided to support the four-parallel operation and are connected in a tandem manner, respectively. The front flip-flops FF1 to FF4 and the subsequent flip-flops FF5 to FF8 sequentially hold digital data outputted onto the bus lines 15-1 to 15-4 in synchronization with the transfer unit clock.

As a result, the front flip-flops FF1 to FF4 hold the digital data outputted from the column signal processing circuit 13 in the selection and scan operation performed by the column scan circuit 14 using the preceding column-address unit, while the subsequent flip-flops FF5 to FF8 hold the digital data outputted from the column signal processing circuit 13 in the selection and scan operation performed by the column scan circuit 14 using the present column-address unit. That is, the hold circuit 16 holds 8-column digital data, which correspond to 2 unit clocks, that is, 8-pixel digital data.

The selector unit 17 receives the outputs from the front flip-flops FF1 to FF4 and the subsequent flip-flops FF5 to FF8, and among the digital data held in the flip-flops FF1 to FF8, outputs the digital data held in the flip-flops selected by the lower bits of the column selection address as the outputs 1 to 4.

Figure 2:
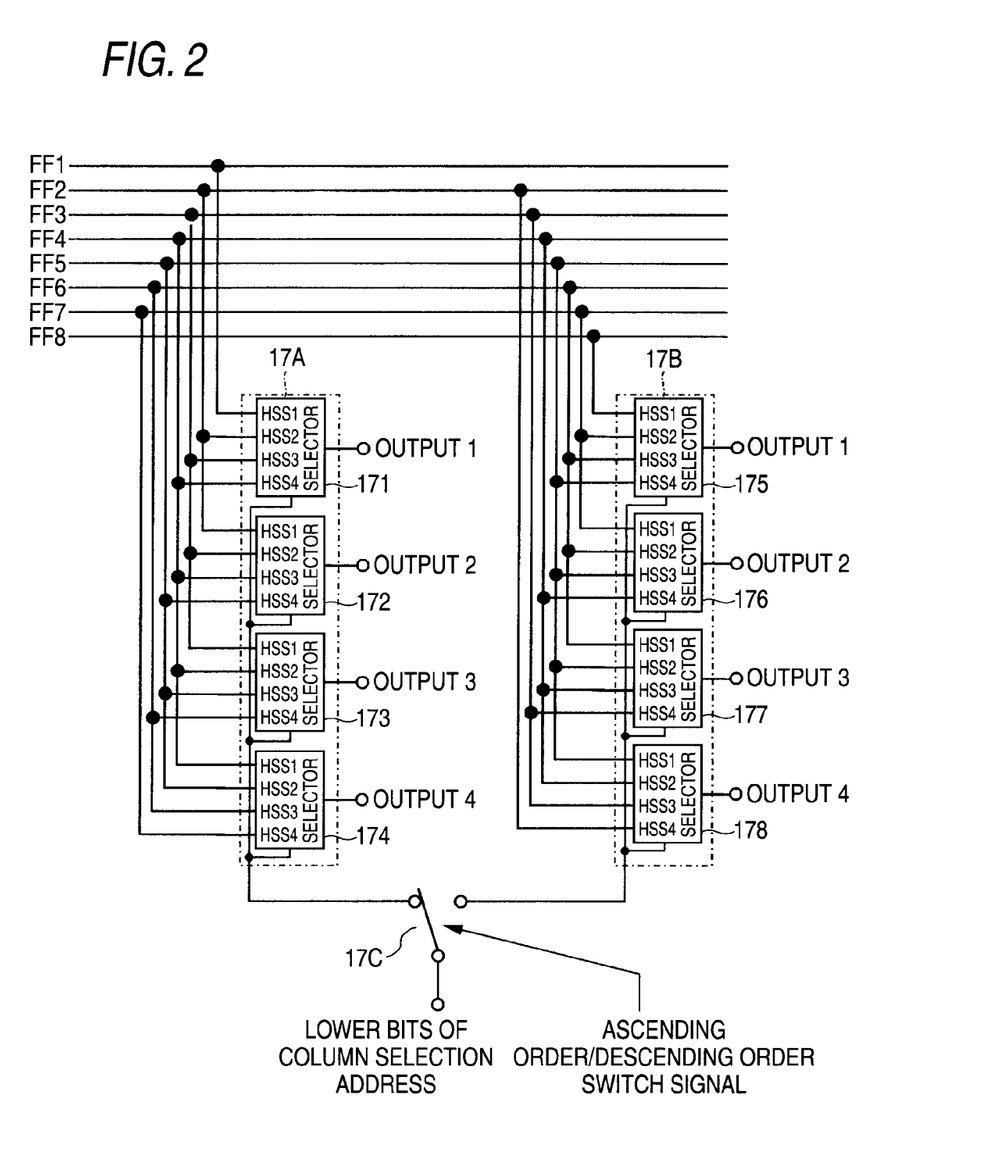
FIG. 2 is a block diagram showing one example of the specific configuration of the selector unit.

FIG. 2 is a block diagram showing one example of the specific configuration of the selector unit 17. As shown in FIG. 2, the selector unit 17 includes a group of ascending-order selectors 17A, a group of descending-order selectors 17B and a switch 17C that selectively provides the lower bits of the column selection address either to the group of ascending-order selectors 17A or the group of descending-order selectors 17B based on an ascending order/descending order switch signal provided from outside.

The group of ascending-order selectors 17A includes four selectors 171 to 174 provided to support the four-parallel operation. The selector 171 receives the digital data held in the flip-flops FF1 to FF4 as four inputs HSS1 to HSS4 and outputs one input from the four inputs HSS1 to HSS4 selected by the lower bits of the column selection address, that is, any one of the digital data in the flip-flops FF1 to FF4, as the output 1.

The selector 172 receives the digital data held in the flip-flops FF2 to FF5 as four inputs HSS1 to HSS4 and outputs one input from the four inputs HSS1 to HSS4 selected by the lower bits of the column selection address, that is, any one of the digital data in the flip-flops FF2 to FF5, as the output 2.

The selector 173 receives the digital data held in the flip-flops FF3 to FF6 as four inputs HSS1 to HSS4 and outputs one input from the four inputs HSS1 to HSS4 selected by the lower bits of the column selection address, that is, any one of the digital data in the flip-flops FF3 to FF6, as the output 3.

The selector 174 receives the digital data held in the flip-flops FF4 to FF7 as four inputs HSS1 to HSS4 and outputs one input from the four inputs HSS1 to HSS4 selected by the lower bits of the column selection address, that is, any one of the digital data in the flip-flops FF4 to FF7, as the output 4.

In the group of ascending-order selectors 17A configured as described above, when the lower bits of the column selection address provided via the switch 17C select the inputs HSS1 of the selectors 171 to 174, the digital data in the flip-flops FF1 to FF4 are outputted from the selectors 171 to 174 as the outputs 1 to 4.

Similarly, when the lower bits of the column selection address select the inputs HSS2, the digital data in the flip-flops FF2 to FF5 are outputted from the selectors 171 to 174 as the outputs 1 to 4. When the inputs HSS3 are selected, the digital data in the flip-flops FF3 to FF6 are outputted from the selectors 171 to 174 as the outputs 1 to 4. When the inputs HSS4 are selected, the digital data in the flip-flops FF4 to FF7 are outputted from the selectors 171 to 174 as the outputs 1 to 4.

That is, when the lower bits of the column selection address select the same inputs from the four inputs HSS1 to HSS4, the selectors 171 to 174 output the digital data in the flip-flops FF1 to FF7 that hold digital data of the consecutive pixels in the ascending order in the direction the columns are arranged as the outputs 1 to 4. The four inputs HSS1 to HSS4 of the selectors 171 to 174 corresponding to the outputs 1 to 4 are arranged such that the digital data in the flip-flops FF1 to FF7 that hold digital data of the consecutive pixels in the ascending order can be sequentially selected.

More specifically, consider now that pixel data are outputted in parallel on a four-column (four-pixel) basis in the ascending-order scan in the direction the columns are arranged (the left-to-right scan in FIG. 1) and let 1, 2, 3, 4, 5, 6, 7, . . . be the signals of the pixels from the left in a certain row in the figure. Pixel data are selectively outputted in parallel not only on a four-column basis but also on a column-address basis in which the column address overlaps with the four-column unit, that is, when the inputs HSS1 are selected, "1, 2, 3, 4", "5, 6, 7, 8", . . . are outputted; when the inputs HSS2 are selected, "2, 3, 4, 5", "6, 7, 8, 9", . . . are outputted; when the inputs HSS3 are selected, "3, 4, 5, 6", "7, 8, 9, 10", . . . are outputted; and when the inputs HSS4 are selected, "4, 5, 6, 7", "8, 9, 10, 11", . . . are outputted.

The group of descending-order selectors 17B includes four selectors 175 to 178 provided to support the four-parallel operation. The selector 175 receives the digital data held in the flip-flops FF8 to FF5 as the four inputs HSS1 to HSS4 and outputs one input from the four inputs HSS1 to HSS4 selected by the lower bits of the column selection address, that is, any one of the digital data in the flip-flops FF8 to FF5, as the output 1.

The selector 176 receives the digital data held in the flip-flops FF7 to FF4 as the four inputs HSS1 to HSS4 and outputs one input from the four inputs HSS1 to HSS4 selected by the lower bits of the column selection address, that is, any one of the digital data in the flip-flops FF7 to FF4, as the output 2.

The selector 177 receives the digital data held in the flip-flops FF6 to FF3 as the four inputs HSS1 to HSS4 and outputs one input from the four inputs HSS1 to HSS4 selected by the lower bits of the column selection address, that is, any one of the digital data in the flip-flops FF6 to FF3, as the output 3.

The selector 178 receives the digital data held in the flip-flops FF5 to FF2 as the four inputs HSS1 to HSS4 and outputs one input from the four inputs HSS1 to HSS4 selected by the lower bits of the column selection address, that is, any one of the digital data in the flip-flops FF5 to FF2, as the output 4.

In the group of descending-order selectors 17B configured as described above, when the lower bits of the column selection address provided via the switch 17C select the inputs HSS1 of the selectors 175 to 178, the digital data in the flip-flops FF8 to FF5 are outputted from the selectors 175 to 178 as the outputs 1 to 4.

Similarly, when the lower bits of the column selection address select the inputs HSS2, the digital data in the flip-flops FF7 to FF4 are outputted from the selectors 175 to 178 as the outputs 1 to 4. When the inputs HSS3 are selected, the digital data in the flip-flops FF6 to FF3 are outputted from the selectors 175 to 178 as the outputs 1 to 4. When the inputs HSS4 are selected, the digital data in the flip-flops FF5 to FF2 are outputted from the selectors 175 to 178 as the outputs 1 to 4.

That is, when the lower bits of the column selection address select the same inputs from the four inputs HSS1 to HSS4, the selectors 175 to 178 output the digital data in the flip-flops FF1 to FF7 that hold digital data of the consecutive pixels in the descending order in the direction the columns are arranged as the outputs 1 to 4. The four inputs HSS1 to HSS4 of the selectors 175 to 178 corresponding to the outputs 1 to 4 are arranged such that the digital data in the flip-flops FF1 to FF7 that hold digital data of the consecutive pixels in the descending order can be sequentially selected.

More specifically, consider now that pixel data are outputted in parallel on a four-column basis in the descending-order scan in the direction the columns are arranged (the right-to-left scan in FIG. 1) and let 16, 15, 14, 13, 12, 11, 10, . . . be the signals of the pixels from the right in a certain row in the figure. Pixel data are selectively outputted in parallel not only on a four-column basis but also on a column-address basis in which the column address overlaps with the four-column unit, that is, when the inputs HSS1 are selected, "16, 15, 14, 13", "12, 11, 10, 9", . . . are outputted; when the inputs HSS2 are selected, "15, 14, 13, 12", "11, 10, 9, 8", . . . are outputted; when the inputs HSS3 are selected, "14, 13, 12, 11", "10, 9, 8, 7", . . . are outputted; and when the inputs HSS4 are selected, "13, 12, 11, 10", "9, 8, 7, 6", . . . are outputted.

A solid-state imaging device according to this embodiment configured as described above is designed to perform window cutting in which the signals of the pixels 20 are read from a specific area in the pixel array unit 11. To specify a window area to be cut, the row scan circuit 12 and the column scan circuit 14 specify the row address and the column address, respectively. That is, the row scan circuit 12 and the column scan circuit 14 form a control unit (control means set forth in the claims) for performing window cutting.

The hold circuit 16 and the selector unit 17 form a selection unit (selection means set forth in the claims) for, when the window cutting is performed on a column-address basis in which the column address overlaps with the multiple-column unit (four-column unit, in this example), holding the pixel data read from pixels in the present column-address unit and the pixel data read from pixels in the preceding column-address unit, and selecting and outputting consecutive pixel data on a four-column basis from the thus held pixel data of the present column-address unit and the preceding column-address unit.

By way of example, in the solid-state imaging device that outputs pixel data in parallel on a four-column basis, a description will be made of the operation in which window cutting is performed on a column-address basis in which the column address overlaps with the four-column unit so as to perform horizontal transfer-based parallel output in the ascending-order scan (forward scan) starting from the pixel in the column H3.

Firstly, when the upper bits of the column selection address are inputted to turn the output HSM1 of the column scan circuit 14 active, the pixel data of the columns H1 to H4 that form a unit are outputted onto the bus lines 15-1 to 15-4, respectively.

Next, when the upper bits of the column selection address are incremented at the timing of the unit clock for the next transfer so as to turn the output HSM2 of the column scan circuit 14 active, the pixel data of the columns H5 to H8 that form the next unit are outputted onto the data buses 15-1 to 15-4, respectively, and at the same time, the pixel data of the columns H1 to H4 outputted onto the bus lines 15-1 to 15-4 at the preceding unit clock are held in the subsequent flip-flops FF5 to FF8 in the hold circuit 16.

At the timing of the unit clock for the next transfer, the pixel data of the columns H1 to H4 held in the subsequent flip-flops FF5 to FF8, that is, the pixel data of the preceding column-address unit, are moved to the front flip-flops FF1 to FF4, and the pixel data of the columns H5 to H8, that is, the pixel data of the present column-address unit, are newly held in the subsequent flip-flops FF5 to FF8.

In this description, since the horizontal transfer direction corresponds to the ascending order, in FIG. 2, the switch 17C delivers the lower bits of the column selection address inputted from outside to the group of ascending-order selectors 17A. Prior to this operation, the address that selects the inputs HSS3 of the selectors 171 to 174 in the group of ascending-order selectors 17A is outputted to the lower bits of the column selection address.

Then, the selector 171 outputs the pixel data held in the flip-flop FF3, that is, the pixel data of the column H3, as the output 1. The selectors 172, 173 and 174 output the pixel data of the column H4 as the output 2, the pixel data of the column H5 as the output 3 and the pixel data of the column H6 as the output 4, respectively.

Consequently, window cutting is performed on a column-address basis in which the column address overlaps with the four-column unit in the ascending-order scan (forward scan) starting from the pixel in the column H3. Once the cutting address is fixed, it is not necessary to change the lower bits of the column selection address for each unit clock.

Thus, in the solid-state imaging device that outputs pixel data in parallel on a multiple-column basis (four-column basis, in this example), the hold circuit 16 holds pixel data read from pixels in the present column-address unit and pixel data read from pixels in the preceding column-address unit, and the group of ascending-order selectors 17A selects and outputs consecutive pixel data on a multiple-column basis from the thus held pixel data of the present column-address unit and the preceding column-address unit, so that window cutting can be performed on a column-address basis in which the column address overlaps with the multiple-column unit without limiting the cutting unit to a multiple of the multiple-column unit, allowing window cutting using a unit smaller than the multiple-column unit independent of the parallel output start position and the number of parallel outputs.

In this example, although the description has been made with reference to the case where the cutting is performed on a column-address basis in which the column address overlaps with the multiple-column unit, when the cutting is performed such that the column address does not overlap with the multiple-column unit, the window cutting can be achieved by using only the pixel data held in the front flip-flops FF1 to FF4 provided that the selectors 171 to 174 in the group of selectors 17A are connected to the flip-flops FF1 to FF8 as shown in FIG. 2.

It should be noted that FIG. 2 shows only one example of how the selectors 171 to 174 are connected. By changing the form of connection, it is also possible to perform window cutting by using only the pixel data held in the subsequent flip-flops FF5 to FF8.

In the solid-state imaging device that outputs pixel data in parallel on a four-column basis, a description will now be made of the operation in which the window cutting is performed to carry out horizontal transfer-based parallel output in the descending-order scan (backward scan) starting from the pixel in the column H8.

Since the window cutting in this case is performed such that the window does not overlap with the multiple-column unit, the window cutting is achieved by using only the pixel data held in the subsequent flip-flops FF5 to FF8 provided that the selectors 175 to 178 in the group of selectors 17B are connected to the flip-flops FF1 to FF8 as shown in FIG. 2.

It should be noted that FIG. 2 shows only one example of how the selectors 175 to 178 are connected. By changing the form of connection, it is also possible to perform window cutting by using only the pixel data held in the front flip-flops FF1 to FF4.

Firstly, when the upper bits of the column selection address are inputted to turn the output HSM2 of the column scan circuit 14 active, the pixel data of the columns H5 to H8 that form a unit are outputted onto the bus lines 15-1 to 15-4, respectively, and held in the subsequent flip-flops FF5 to FF8 in the hold circuit 16 via the bus lines 15-1 to 15-4.

In this description, since the horizontal transfer direction corresponds to the descending order, in FIG. 2, the switch 17C delivers the lower bits of the column selection address inputted from outside to the group of descending-order selectors 17B. Prior to this operation, the address that selects the inputs HSS1 of the selectors 175 to 178 in the group of descending-order selectors 17B is outputted to the lower bits of the column selection address.

Then, the selector 175 outputs the pixel data held in the flip-flop FF8, that is, the pixel data of the column H8, as the output 1. The selectors 176, 177 and 178 output the pixel data of the column H7 as the output 2, the pixel data of the column H6 as the output 3 and the pixel data of the column H5 as the output 4, respectively.

Next, when the upper bits of the column selection address are incremented at the timing of the unit clock for the next transfer so as to turn the output HSM1 of the column scan circuit 14 active, the pixel data of the columns H1 to H4 that form the next unit are outputted onto the data buses 15-1 to 15-4, respectively, and held in the subsequent flip-flops FF5 to FF8 in the hold circuit 16 via the bus lines 15-1 to 15-4.

Then, when the selectors 175 to 178 select the inputs HSS1, the selector 175 outputs the pixel data held in the flip-flop FF8, that is, the pixel data of the column H4, as the output 1. The selectors 176, 177 and 178 output the pixel data of the column H3 as the output 2, the pixel data of the column H2 as the output 3 and the pixel data of the column H1 as the output 4, respectively.

Consequently, window cutting is performed on a column-address basis in which the column address does not overlap with the four-column unit in the descending-order scan (backward scan) starting from the pixel in the column H8. Once the cutting address is fixed, it is not necessary to change the lower bits of the column selection address for each unit clock, as in the ascending-order scan.

In related art in which the group of descending-order selectors 17B is not incorporated, when the pixel in the column H8 is used as the starting point to perform window cutting in the descending-order scan, pixel data are outputted on an ascending-order transfer basis although it is intended to perform descending-order transfer, because the columns corresponding to the outputs 1 to 4 are fixed, that is, the pixel data of the columns 5, 6, 7 and 8 are first outputted as the outputs 1 to 4, and the pixel data of the columns 1, 2, 3 and 4 are then outputted.

Although the above description was made of the case where the window cutting is performed such that the window does not overlap with the multiple-column unit, when the window cutting is performed on a column-address basis in which the column address overlaps with the multiple-column unit, the pixel data held in the front flip-flops FF1 to FF4 and the subsequent flip-flops FF5 to FF8 may be used and the group of descending-order selectors 17B is used to select and output consecutive pixel data on a multiple-column basis from the thus held pixel data of the present column-address unit and the preceding column-address unit, as in the ascending-order scan.

As described above, by using the selectors 175 to 178 in the group of descending-order selectors 17B to invert the order of the pixel data of the present column-address unit held in the subsequent flip-flops FF5 to FF8 (or the pixel data of the preceding column-address unit held in the front flip-flops FF1 to FF4), the pixel data can be outputted on the descending-order transfer basis as the outputs 1 to 4. Therefore, when window cutting is performed in the descending-order scan, pixel data can be outputted in parallel in the order in which the pixels arranged in the pixel array unit 11 are scanned, as in the window cutting in the ascending-order scan.

Thus, in the solid-state imaging device that outputs pixel data in parallel on a multiple-column basis (four-column basis, in this example), when window cutting is performed in the descending-order scan, pixel data can be outputted in parallel in the scanning order of the pixel arrangement. Therefore, it is not necessary sort the order of the signals according to the pixel arrangement in the following signal processing system, thereby contributing to reduced burden on the following signal processing system and a simplified configuration of the following signal processing system.

Particularly, the hold circuit 16 and the selector unit 17 are mounted on the same semiconductor substrate (chip) 18 as the pixel array unit 11, the row scan circuit 12, the column signal processing circuit 13, the column scan circuit 14, the bus lines 15 and the like, and pixel data can be outputted in parallel in the order in which pixels arranged in the pixel array unit 11 are scanned, so that even when window cutting is performed in the descending-order scan, the ascending order scan-based existing IC corresponding to parallel outputs can be advantageously used without any modification as a signal processing IC that forms the signal processing system external to the substrate.

Figure 3:
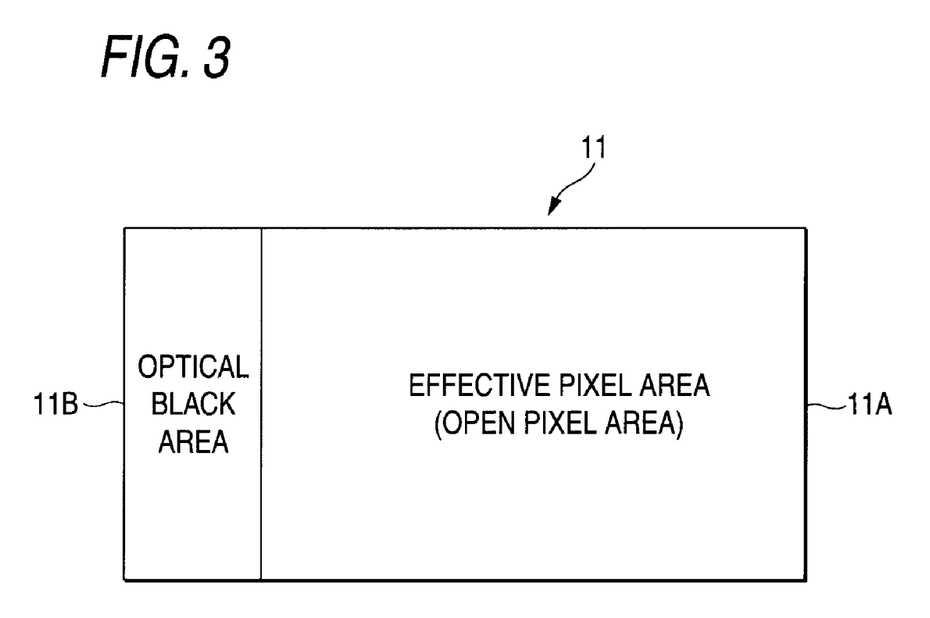
FIG. 3 is a conceptual view showing an exemplary configuration of the pixel array unit including the optical black area.

As shown in FIG. 3, the pixel array unit 11 typically includes not only an effective pixel area (open pixel area) 11A in which the signal from each pixel 20 is used as an imaging signal but also an optical black area 11B, disposed at the periphery of the effective pixel area 11A, in which the pixels are shielded and signals from the pixels are not used as imaging signals but are used to determine the reference level of imaging signals.

Pixel signals are regularly read from the optical black area 11B whether or not window cutting is performed in a horizontal transfer operation. Therefore, when window cutting is performed, signals are first read from pixels in the optical black area 11B, and signals are then read from the pixels in the window cutting area.

Figure 4:
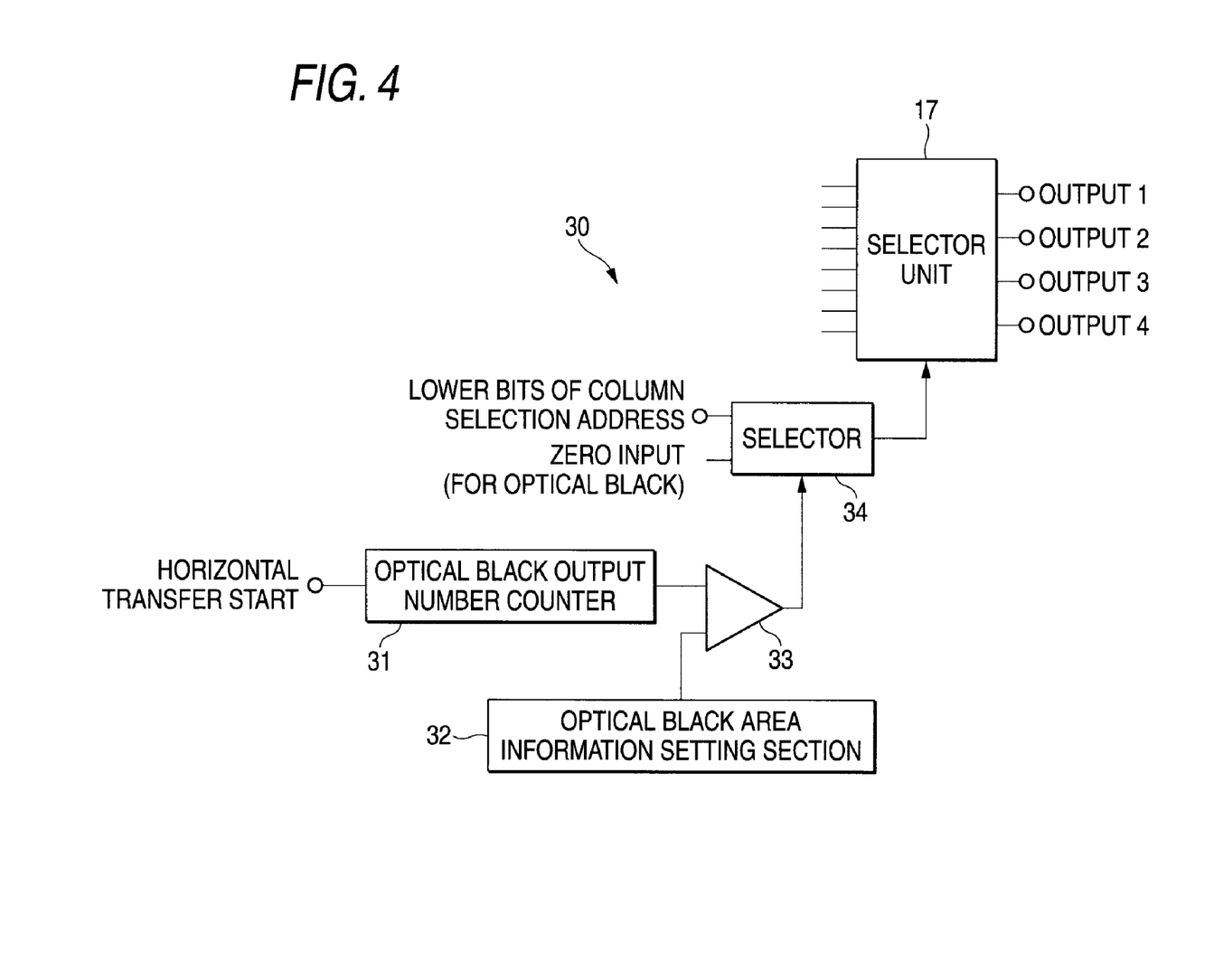
FIG. 4 is a block diagram showing the main portion of the configuration designed to read signals from pixels in the optical black area.

FIG. 4 is a block diagram showing the main portion of the configuration designed to read signals from pixels in the optical black area 11B. The selector 17 shown in FIG. 4 corresponds to the selector 17 shown in FIG. 1.

The configuration shown in FIG. 4 is characterized by a specific configuration of an address control circuit 30 that controls the lower bits of the column selection address to be provided to the selector unit 17. Specifically, the address control circuit 30 includes an optical black output counter 31, an optical black area information setting section 32, a comparator 33 and a selector 34.

The optical black output counter 31 receives a horizontal transfer start signal when horizontal transfer is initiated for each row. The optical black output counter 31 performs a count operation on a pixel basis when pixel data in the optical black area 11B is read out. The optical black area information setting section 32 sets the number of pixels in the direction in which the columns are arranged (horizontal direction) in the optical black area 11B.

The comparator 33 receives the count value of the optical black output counter 31 as comparative input, receives the number of pixels set by the optical black area information setting section 32 as comparative reference input, and determines that the readout of the pixels (horizontal transfer output) in the optical black area 11B is completed when the count value of the optical black output counter 31 exceeds the number of pixels set by the optical black area information setting section 32.

The selector 34 selects zero input for the optical black area 11B and supplies it to the selector unit 17. In this way, the readout of the optical black area 11B, which is a fixed area, is performed. When the comparator 33 determines that the readout of the pixels in the optical black area 11B has been completed, the comparator 33 selects the lower bits of the column selection address and supplies them to the selector unit 17 in response to the determination result. In this way, the window cutting operation described above can be performed.

Thus, in the solid-state imaging device having the optical black area 11B in the pixel array unit 11, an identification unit formed of the optical black output counter 31 and the comparator 33 automatically identifies whether the readout is from pixels inside the optical black area 11B or pixels outside the optical black area 11B, and window cutting is performed after the pixels in the optical black area 11B are read out. Therefore, window cutting can be performed without using an external control system to count the internal timing of the sensor (solid-state imaging device), thereby reducing the burden on the external control system.

In the above embodiment, although the description has been made with reference to the case where the group of ascending-order selectors 17A and the group of descending-order selectors 17B are provided to support the ascending-order and descending-order scans, it is possible to employ a configuration in which only one of the group of ascending-order selectors 17A and the group of descending-order selectors 17B is provided to support only the ascending-order scan or the descending-order scan.

In the above embodiment, although the description has been made with reference to the case where the invention is applied to a CMOS image sensor, the invention is not limited thereto. The invention can be similarly applied to other X-Y addressing-type solid-state imaging devices different from CMOS image sensors, as well as charge coupled-type solid-state imaging devices represented by a CCD (Charge Coupled Device) image sensor.

When the invention is applied to a charge coupled-type solid-state imaging device, such as a CCD image sensor, the invention can be implemented by providing a plurality of horizontal transfer sections corresponding to the number of columns for parallel outputs and assigning the functions of the hold circuit 16 and the selector unit 17 (see FIG. 1) to the output stages of the plurality of horizontal transfer sections, or assigning the functions of the hold circuit 16 and the selector unit 17 to the subsequent stages of a plurality of charge detectors that convert signal charges transferred by the plurality of the horizontal transfer sections into electric signals.

[Applications]

The solid-state imaging device according to the above embodiment is suitable when used as an imaging device in an imaging apparatus, such as a digital still camera and video camcorder.

The imaging apparatus used herein refers to a camera module including a solid-state imaging device as the imaging device, an optical system that focuses image light from a subject onto the imaging plane (light reception plane) of the solid-state imaging device and a signal processing circuit of the solid-state imaging device, as well as a camera system, such as a digital still camera and a video camcorder equipped with the camera module.

Figure 5:
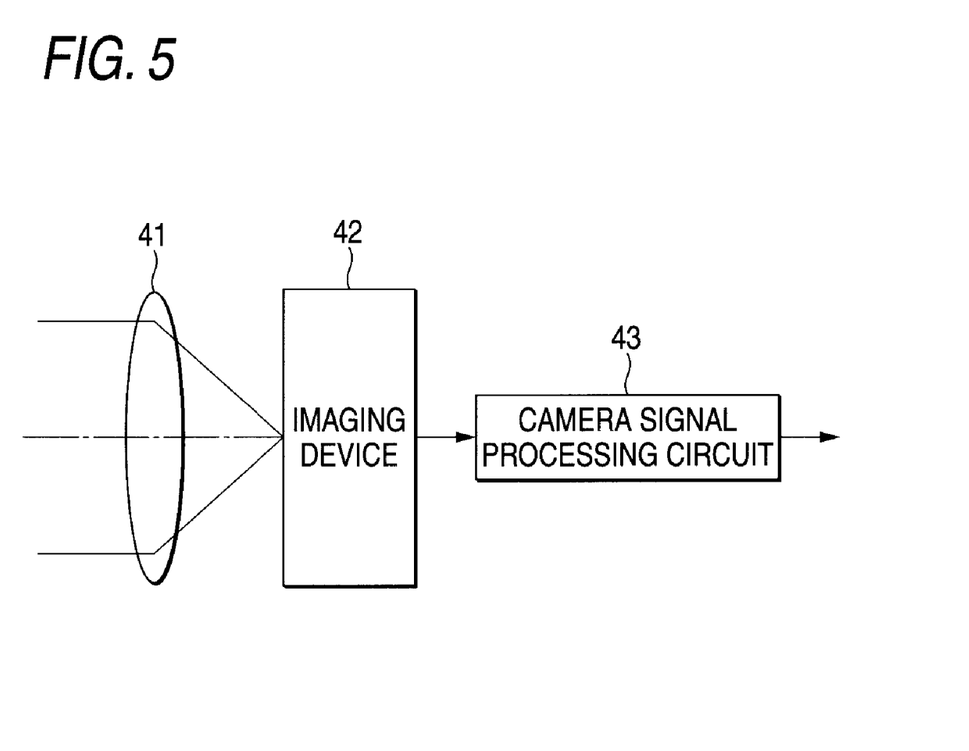
FIG. 5 is a block diagram showing an exemplary configuration of the imaging apparatus according to an embodiment of the invention.

FIG. 5 is a block diagram showing an exemplary configuration of the imaging apparatus according to an embodiment of the invention. As shown in FIG. 5, the imaging apparatus according to this example includes an optical system having a lens 41, an imaging device 42 and a camera signal processing circuit 43.

The lens 41 focuses image light from a subject onto the imaging plane of the imaging device 42. The imaging device 42 converts the image light focused on the imaging plane by the lens 41 into an electric signal on a pixel basis and outputs the resultant image signal. The solid-state imaging device according to the embodiment described above is used as the imaging device 42. The camera signal processing circuit 43 performs various types of signal processing on the image signal outputted from the imaging device 42.

As described above, in an imaging apparatus, such as a video camcorder and an electronic still camera as well as a camera module for a mobile instrument, such as a mobile phone, by using the solid-state imaging device according to the embodiment described above as the imaging device 42, window cutting can be performed in the solid-state imaging device on a column-address basis in which the column address overlaps with the multiple-column unit without limiting the cutting unit to a multiple of the multiple-column unit, advantageously allowing window cutting using a unit smaller than the multiple-column unit.

In the solid-state imaging device according to the embodiment described above, when window cutting is performed in the descending-order scan, pixel data can be outputted in parallel in the scanning order of the pixel arrangement. Therefore, it is not necessary to sort the order of the signals according to the pixel arrangement outside the device, providing another advantage of reduced burden on the camera signal processing circuit 43 and a simplified configuration of the camera signal processing circuit 43.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   a pixel array unit comprising pixels in a two-dimensional matrix with columns and rows, each pixel comprising a photoelectric converter which generates a signal relating to light incident thereon, the pixel array unit making signals available for read-out in parallel on a multiple-column basis;
   control means for performing window cutting in which a set of the signals are read from a set of the pixels in a specific area in the pixel array unit on a column-address basis;
   output lines selectively coupled to the columns of the pixel array unit for receiving the signals transferred thereto from the pixels in the pixel array unit, the set of the signals from a set of columns which are transferred in parallel to the output lines at the same time being a multiple-column unit; and
   selection means for, when the window cutting is performed by the control means such that the window cutting overlaps with the multiple-column unit, holding the signals read from the pixels in a present column-address unit in tandem with the signals read from the pixels in a preceding column-address unit, selecting consecutive signals on the multiple-column basis from the thus held signals of the present column-address unit and the preceding column-address unit and outputting the selected consecutive signals,
   wherein,
      the present column-address unit comprises a second multiple-column unit of signals most recently transferred from the pixel array unit, and
      the preceding column-address unit comprises a first multiple-column unit of signals next most recently transferred from the pixel array unit.

2. The solid-state imaging device according to claim 1, wherein the selection means, the pixel array unit and the control means are mounted on a common substrate.

3. The solid-state imaging device according to claim 1, wherein the selection means outputs the set of the signals of the set of the pixels in parallel in a scanning order of the pixels in the pixel array unit, the selection means being configured to perform an ascending-order scan and a descending-order scan.

4. A solid-state imaging device comprising:
   a pixel array unit comprising pixels in a two-dimensional matrix with columns and rows, each pixel comprising a photoelectric converter which generates a signal relating to light incident thereon, the pixel array unit making signals available for read-out in parallel on a multiple-column basis;
   control means for performing window cutting in which a set of the signals are read from a set of the pixels in a specific area in the pixel array unit on a column-address basis;
   output lines selectively coupled to the columns of the pixel array unit for receiving the signals transferred thereto from the pixels in the pixel array unit, the set of the signals from a set of columns which are transferred in parallel to the output lines at the same time being a multiple-column unit;
   selection means for, when the window cutting is performed by the control means such that the window cutting overlaps with the multiple-column unit, holding the signals read from the pixels in a present column-address unit in tandem with the signals read from the pixels in a preceding column-address unit, selecting consecutive signals on the multiple-column basis from the thus held signals of the present column-address unit and the preceding column-address unit and outputting the selected consecutive signals, and
   determination means for determining whether the signals are read from pixels in a light-shielded optical black area in the pixel array unit or pixels outside of the light-shielded optical black area,
   wherein,
      the present column-address unit comprises a second multiple-column unit of signals most recently transferred from the pixel array unit,
      the preceding column-address unit comprises a first multiple-column unit of signals next most recently transferred from the pixel array unit, and
      the control means performs the window cutting based on a determination result from the determination means.

5. A method for driving a solid-state imaging device that includes a pixel array unit (1) comprising pixels in a two dimensional matrix with columns and rows, each pixel comprising a photoelectric converter that generates a signal related to light incident thereon, and (2) making signals for read out from the pixel array unit in parallel on a multiple-column basis, a set of the signals from a set of columns which are read out in parallel at the same time being a multiple-column unit, the method comprising the step of:
   when window cutting, in which signals are read from the pixels in a specific area in the pixel array unit, is performed on a column-address basis such that the window cutting overlaps with the multiple-column unit, holding the signals read from the pixels in a present column-address unit in tandem with the signals read from the pixels in a preceding column-address unit, selecting consecutive signals on the multiple-column basis from the thus held signals of the present column-address unit and the preceding column-address unit and outputting the selected consecutive signals, wherein,
the present column-address unit comprises a second multiple-column unit of signals most recently transferred from the pixel array unit, and
the preceding column-address unit comprises a first multiple-column unit of signals next most recently transferred from the pixel array unit.

6. An imaging apparatus comprising:
a solid-state imaging device; and
an optical system that guides light from a subject onto an imaging plane of the solid-state imaging device,
wherein,
the solid-state imaging device comprises
  (a) a pixel array unit (1) comprising pixels in a two-dimensional matrix, each pixel comprising a photoelectric converter which generates signal related to light incident thereon, and (2) making signals available for read out from the pixel array unit in parallel on a multiple-column basis,
  (b) control means for performing window cutting in which a set of the signals are read from a set of the pixels in a specific area in the pixel array unit on a column-address basis,
  (c) output lines selectively coupled to the columns of the pixel array unit for receiving the signals transferred thereto from the pixels in the pixel array unit, the set of the signals from a set of columns which are transferred in parallel to the output lines at the same time being a multiple-column unit, and
  (d) selection means for, when the window cutting is performed by the control means on the column-address basis such that the window cutting overlaps with the multiple-column unit, holding the signals read from the pixels in a present column-address unit in tandem with the signals read from the pixels in a preceding column-address unit, selecting consecutive signals on the multiple-column basis from the thus held signals of the present column-address unit and the preceding column-address unit and outputting the selected consecutive signals, and wherein,
  the present column-address unit comprises a second multiple-column unit of signals most recently transferred from the pixel array unit, and
  the preceding column-address unit comprises a first multiple-column unit of signals next most recently transferred from the pixel array unit.

7. A solid-state imaging apparatus comprising:
a pixel array unit (1) comprising pixels in a two-dimensional matrix, each pixel comprising a photoelectric converter which generates a signal related to light incident thereon, and (2) making signals available for read out from the pixel array unit in parallel on a multiple-column basis;
a controller performing window cutting in which a set of the signals are read from a set of the pixels in a specific area in the pixel array unit on a column-address basis;
output lines selectively coupled to the columns of the pixel array unit for receiving the signals transferred thereto from the pixels in the pixel array unit, the set of the signals from a set of columns which are transferred in parallel to the output lines at the same time being a multiple-column unit; and
a selector for, when the window cutting is performed by the controller on a column-address basis such that the window cutting overlaps with the multiple-column unit, holding the signals read from the pixels in a present column-address unit in tandem with the signals read from the pixels in a preceding column-address unit, selecting consecutive signals on the multiple-column basis from the thus held signals of the present column-address unit and the preceding column-address unit and outputting the selected consecutive signals,
wherein,
the present column-address unit comprises a second multiple-column unit of signals most recently transferred from the pixel array unit, and
the preceding column-address unit comprises a first multiple-column unit of signals next most recently transferred from the pixel array unit.

8. An imaging apparatus comprising:
a solid-state imaging device; and
an optical system that guides light from a subject onto the imaging plane of the solid-state imaging device,
wherein the solid-state imaging device comprises
  (a) a pixel array unit (1) comprising pixels in a two-dimensional matrix, each pixel comprising a photoelectric converter which generates signal related to light incident thereon, and (2) making signals available for read out from the pixel array unit in parallel on a multiple-column basis,
  (b) a controller performing window cutting in which a set of the signals are read from a set of the pixels in a specific area in the pixel array unit,
  (c) output lines selectively coupled to the columns of the pixel array unit for receiving the signals transferred thereto from the pixels in the pixel array unit, the set of the signals from a set of columns which are transferred in parallel to the output lines at the same time being a multiple-column unit, and
  (d) a selector for, when the window cutting is performed by the controller on a column-address basis such that the window cutting overlaps with the multiple-column unit, holding the signals read from the pixels in a present column-address unit in tandem with the signals read from the pixels in a preceding column-address unit, selecting consecutive signals on the multiple-column basis from the thus held signals of the present column-address unit and the preceding column-address unit and outputting the selected signals, and wherein,
  the present column-address unit comprises a second multiple-column unit of signals most recently transferred from the pixel array unit, and
  the preceding column-address unit comprises a first multiple-column unit of signals next most recently transferred from the pixel array unit.

* * * * *